Nov. 25, 1952 J. A. KRUMHANSL ET AL 2,619,632

PULSE COMMUNICATION SYSTEM

Filed April 23, 1948 3 Sheets-Sheet 1

INVENTORS
JAMES A. KRUMHANSL
GLENN H. MILLER
BY Albert R. Hodges
ATTORNEY

Nov. 25, 1952 J. A. KRUMHANSL ET AL 2,619,632

PULSE COMMUNICATION SYSTEM

Filed April 23, 1948 3 Sheets-Sheet 2

INVENTORS
JAMES A. KRUMHANSL
GLENN H. MILLER
BY
Albert R. Hodges
ATTORNEY

INVENTORS
JAMES A. KRUMHANSL
GLENN H. MILLER
BY
Albert R. Hodges
ATTORNEY

Patented Nov. 25, 1952 2,619,632

UNITED STATES PATENT OFFICE 2,619,632

PULSE COMMUNICATION SYSTEM

James A. Krumhansl, Norwood, R. I., and Glenn H. Miller, Ames, Iowa, assignors to Stromberg-Carlson Company, a corporation of New York Application April 23, 1948, Serial No. 22,804

9 Claims. (Cl. 332—14)

This invention relates to a method of and means for coded pulse communication, and more particularly to systems for such communication employing pulse-time modulation in a manner which substantially enhances the secrecy of communication.

In the ordinary pulse-time modulation system, intelligence is transmitted by a series of pulses of substantially constant amplitude and duration, the time displacement of each pulse with respect either to the preceding pulse or to a reference pulse being varied directly in accordance with the corresponding modulating voltage. The time displacement of each intelligence pulse need not be directly proportional to the signal amplitude. For example, so called "pulse period" modulation may be employed if desired. Such a modulation system is disclosed and claimed in copending application Serial No. 646,614, now abandoned, assigned to the same assignee as the present invention. In this system, the pulse spacing during modulation varies with both the signal amplitude and an exponential function of time. Such a pulse-time modulation system does not provide secrecy of communication, since a receiver employing a conventional averaging detector will yield the intelligence being transmitted.

Pulse-time modulation may be accomplished in two senses. If the sense is positive, the pulse displacement increases with increased signal amplitude. In the case of negative sense transmission, the pulse spacing decreases with increased signal amplitude. Pulse-time modulation, in general, may be accomplished either with or without fixed reference pulses.

A certain degree of secrecy may be achieved in pulse-time modulation systems by alternating the coding of successive pulses between the positive and negative senses. Such an arrangement is disclosed and claimed in copending application Serial No. 646,615, now Pat. No. 2,466,230 issued April 5, 1949, assigned to the same assignee as the present invention. An averaging detector will not respond to this type of coding. If the output pulses from the receiver are used to trigger a multivibrator circuit having two conditions of stable equilibrium, as for example an Eccles-Jordan circuit, and the output of this multivibrator is averaged, the transmitted intelligence may be obtained.

It is a principal object of the present invention to provide an improved pulse communication system.

Another object of the present invention is to provide a communication system utilizing pulse-time modulation.

Still another object of the invention is to utilize a novel form of pulse-time modulation which provides a high degree of secrecy with relatively simple, compact and inexpensive apparatus.

A further object of the invention is to provide a system of pulse-time modulation having an additional variable factor which may be changed at random intervals during the transmission of intelligence.

Still another object of the invention is to provide an arrangement for altering the sense of modulation of the transmitted pulses in a pulse-time modulation system at readily varied intervals.

An additional object of the invention is the provision of improved means for producing a train of time-modulated pulses, which are especially adapted for use in pulse communication systems.

In accordance with the present invention, there is provided means for transmitting intelligence by pulse-time modulation. Means are provided for altering the sense of modulation of predetermined successive groups of transmitted pulses, an arrangement being provided whereby the number of pulses in each group may readily be altered during transmission. To secure synchronization between the coder at the transmitter and the decoder at the receiver, provision is made for the transmission of a synchronizing pulse following each group of intelligence pulses. The synchronizing pulses serve to indicate a changeover from positive to negative coding sense, or vice versa.

Such changeovers may be indicated in other ways if desired. For example, the last intelligence pulse in each group could have its duration or amplitude altered, or the carrier wave within this pulse could be frequency modulated.

Any desired arrangement may be employed to link the coder and the decoder together. For example, the pulsed output of the coder may serve to modulate or control a transmitter of ultrahigh-frequency energy, and a suitable receiver and demodulator provided at the receiving end. Instead of a radio link, it is within the scope of the invention to convey coded intelligence to a remote point over a wire line, a transmission line, or a coaxial line.

The above and other objects and features of the invention will be better understood by reference to the following description taken in connection with the accompanying drawings, in which like components are designated by like reference numerals and in which.

Figure 2:
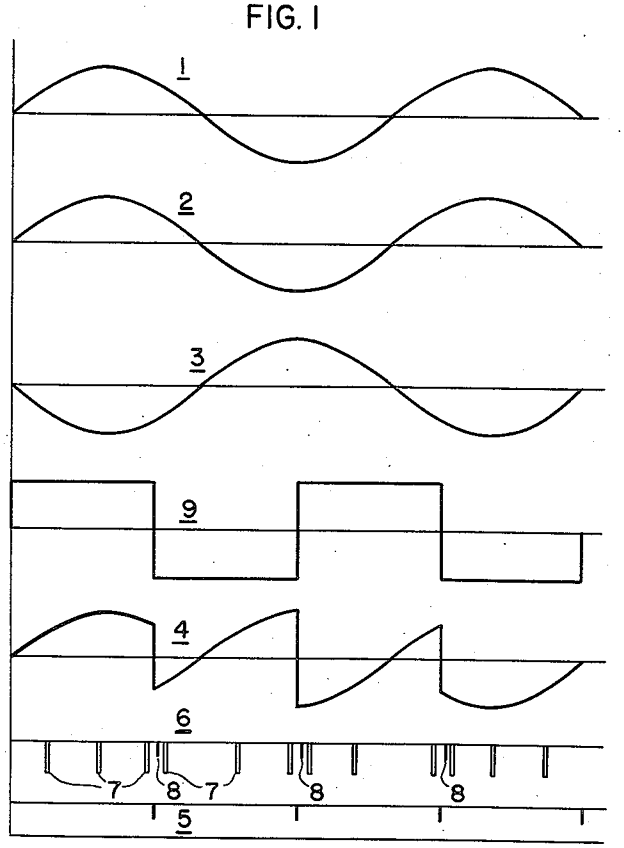
Fig. 2 shows graphically, to a common time base, the voltage wave-forms developed at various points in the coder of Fig. 1.
Figure 6:
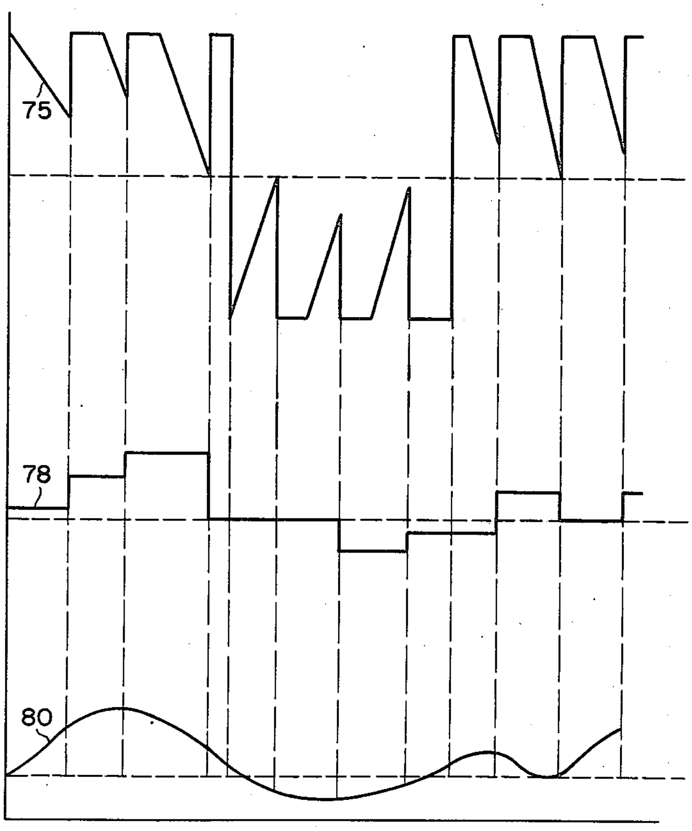
Fig. 6 shows graphically, to a common time base, certain of the voltage waveforms developed in the decoder of Fig. 5.

In the drawings, the encircled reference numerals refer to the corresponding curves or waves represented in Figs. 2 and 6. Reference will be made to these curves in the following description as an aid to a better understanding of the operation of the present invention.

Figure 1:
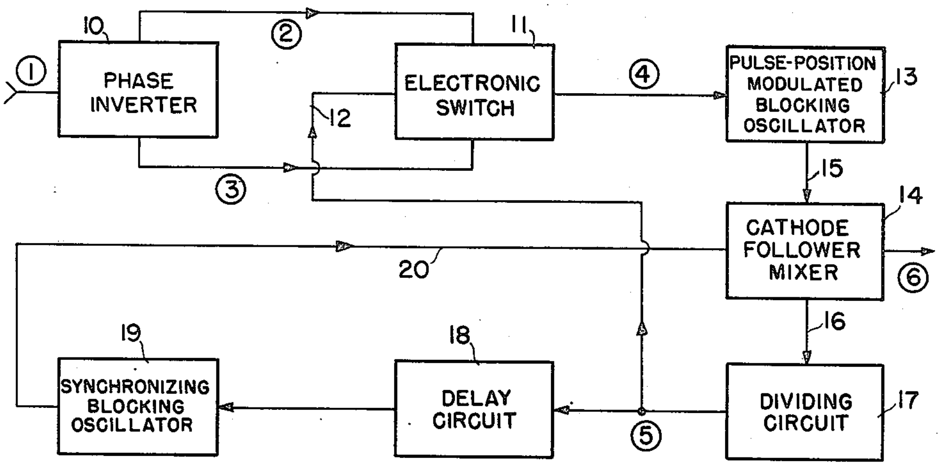
Fig. 1 represents, in block form, a coder and associated apparatus for use at the transmitting end of a pulse communication system in accordance with the present invention.

Referring now to Fig. 1, a modulating wave (curve 1) is supplied from a suitable source of modulating voltage (not shown) to a phase inverter 10, the output of which comprises first and second waves (curves 2 and 3) which are in phase opposition. Phase inverter 10 is of conventional design and hence need not be described in greater detail.

The outputs from phase inverter 10 are supplied to an electronic switch 11. This switch, likewise of conventional design, is arranged selectively to connect either of the two input voltages to its output, the changeover from one input voltage to the other, and vice versa, being controlled by the voltage supplied to electronic switch 11 through the connection 12.

The output voltage from electronic switch 11 may, for example, have the waveform illustrated in Fig. 2 by curve 4 when a suitable control voltage is supplied through connection 12 to the switch.

The output of electronic switch 11 is supplied to a coder unit 13, which is a device adapted to provide a train of pulses the relative spacing of which in time varies in accordance with the input voltage. The output of unit 13 comprises a series of pulses of substantially uniform amplitude and duration but, in general, of varying spacing, and is supplied to a mixer unit 14 by means of connection 15.

One output from mixer unit 14, supplied through connection 16, corresponds in waveform to the signal on connection 15, and is supplied to a dividing circuit 17. Assuming that dividing circuit 17 is arranged to divide by a factor of three, for example, its output will have the waveform indicated by curve 5 in Fig. 2. This output wave is supplied by means of connection 12 to electronic switch 11 and is utilized for the purpose of throwing this switch after each group of three successive pulses has passed through.

The output of dividing circuit 17 is also supplied to a delay circuit 18, the output of which in turn serves to trip a synchronizing blocking oscillator 19. The output of unit 19 comprises a series of pulses of the same periodicity as the series represented by curve 5, but delayed with respect thereto. These delayed synchronizing pulses are supplied by connection 20 to mixer unit 14, in which they are combined with the signal on connection 15. The resultant output wave is represented by curve 6 of Fig. 2, and will be seen to include a plurality of groups of three intelligence pulses 7, of varying spacing, these groups being interspersed by a series of synchronizing pulses 8 of substantially uniform spacing.

Curve 9 of Fig. 2 is intended to represent graphically the operation of electronic switch 11, the positive portions of this wave shape designating the time interval during which switch 11 functions to pass the waveform represented by curve 2, for example, and the negative portion of the wave shape designating the time interval during which electronic switch 11 is conductive for the waveform represented by curve 3. In the example chosen for illustration in Fig. 2, the period of the signal wave (curve 1) is 4/3 that of the switching square wave represented by curve 9. It will be understood, of course, that it is within the scope of the present invention to vary this ratio over a wide range either above or below unity.

Figure 3:
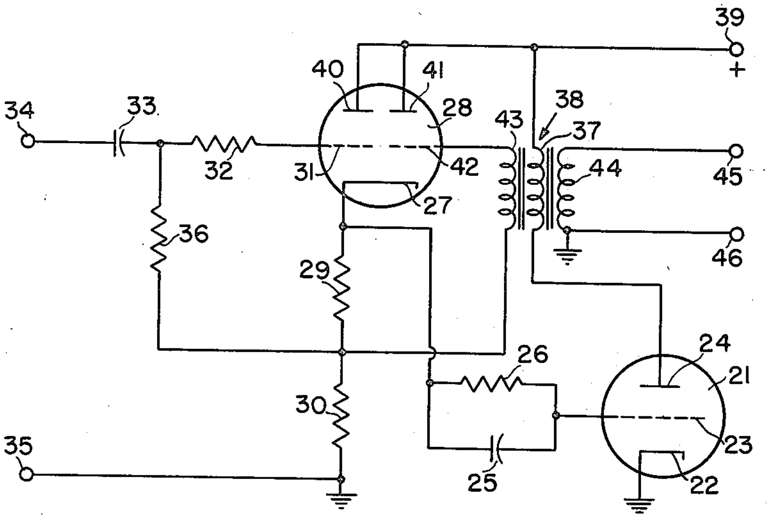
Fig. 3 is a schematic diagram of the portion of the coder of Fig. 1 represented by block 13.

Fig. 3 shows the schematic diagram of a portion of the coder represented by unit 13 of Fig. 1. This unit comprises an electron discharge device 21, which may be a triode vacuum tube having a cathode 22, a control electrode 23, and an anode 24. Cathode 22 may be grounded as shown. A network comprising a capacitor 25 shunted by a resistor 26 has one of its terminals connected to control electrode 23. The other terminal of network 25—26 is connected to the common cathode 27 of an electron discharge device 28, which is preferably a vacuum tube comprising a pair of triodes each having a relatively sharp cutoff characteristic. Vacuum tube 28 may, for example, be of the type 6J6. Cathode 27 of vacuum tube 28 is connected to ground through resistors 29 and 30 in series.

Control electrode 31 of the left-hand portion of vacuum tube 28 is connected through resistor 32 and capacitor 33 in series to a first input terminal 34. The second input terminal 35 is preferably connected directly to ground as shown. A resistor 36 is connected between the junction of resistor 32 and capacitor 33 and the junction of resistors 29 and 30.

The anode 24 of vacuum tube 21 is connected through a first winding 37 of a transformer 38 to a suitable source of positive potential, as indicated at 39. Anodes 40 and 41 of vacuum tube 28 are likewise connected to potential source 39. The control electrode 42 of the right-hand portion of vacuum tube 28 is connected through a winding 43 of transformer 38 to the junction of resistors 29 and 30. A third winding 44 of transformer 38 is connected between a first output terminal 45 and ground. The other output terminal 46 is preferably grounded as shown.

In operation, a suitable input signal is supplied between input terminals 34 and 35. The left-hand portion of vacuum tube 28 functions as a cathode follower, so that the applied input signal is effectively repeated between cathode 27 and ground. This cathode voltage is applied, through network 25—26, to control electrode 23 of vacuum tube 21. This vacuum tube, in combination with transformer 38 and the right-hand portion of vacuum tube 28 functioning as a cathode follower, operates as a blocking oscillator to produce a series of substantially rectangular output pulses between output terminals 45 and 46. The rate at which these pulses are produced is a function of the potential of control electrode 23 relative to cathode 22, this potential in turn depending upon the amplitude of the voltage between cathode 27 of vacuum tube 28 and ground and upon the time constant of network 25—26.

When the blocking oscillator fires, that is, vacuum tube 21 becomes conductive, control electrode 42 of the right-hand portion of vacuum tube 28 is driven positive, so that this portion of this tube becomes highly conductive. The resultant current flow through the circuit including cathode 27 causes a substantial potential drop across resistor 29. This potential drop is of such polarity and of sufficient magnitude to render the left-hand portion of vacuum tube 28 nonconductive. In this manner, no appreciable signal voltage is developed between cathode 27 and ground during the firing portion of the cycle. As a result, the magnitude of the signal voltage at input terminals 34 and 35 can have no influence upon the amount of charge acquired by capacitor 25 due to the flow of grid current in vacuum tube 21 during the firing portion of the cycle.

In other words, network 25—26 is effectively always returned to a constant potential during firing, rather than having the potential of its return point vary in accordance with the applied signal voltage. By this arrangement, which is a feature of the present invention, the time which elapses between a first pulse and a second pulse is made substantially independent of the magnitude of the signal voltage which determined the timing of the first pulse.

When firing ceases upon control electrode 23 reaching a negative potential relative to cathode 22 well beyond cutoff, capacitor 25 gradually discharges through resistor 26. Vacuum tube 21 again becomes conductive as soon as the algebraic sum of the potential across capacitor 25 and the voltage of cathode 27 relative to ground makes control electrode 23 less negative than its cutoff value.

In the meantime, control electrode 42 is no longer driven positive, so that the right-hand portion of vacuum tube 28 is no longer conductive and there is no current flow through resistor 29 due to this tube portion. The left-hand portion of vacuum tube 28 is thus rendered free to function as a cathode follower to repeat at cathode 27 the input signal applied to input terminals 34 and 35.

Still another method for solving the same problem is to apply the signal voltage directly to the control electrode 23 of the blocking oscillator tube 21. The signal voltage source must be of high impedance in this case, so that it will not appreciably effect the time constant of the blocking oscillator circuit, and its time constant must be very large compared with a pulse period in order to prevent the superimposition of a charge on the control electrode.

Although described herein as applied to a blocking oscillator, it will be understood that these expedients may equally be well employed in conjunction with other coding devices, as for example multivibrators, delay multivibrators, "squegging" oscillators, and thyratron relaxation oscillators. In each of these devices, as in the blocking oscillator, the firing process produces a large current flow which is utilized to give a capacitor a certain charge.

Figure 4:
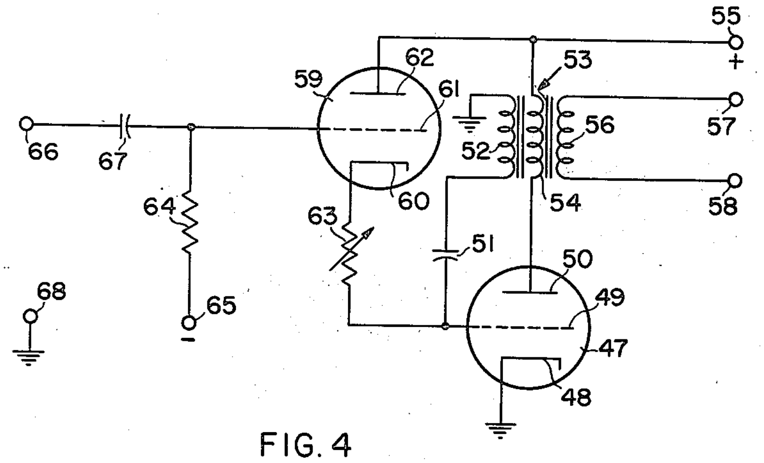
Fig. 4 is a schematic diagram of the dividing circuit represented by block 17 of Fig. 1.

Fig. 4 is the schematic diagram of a dividing circuit such as that represented by block 17 in Fig. 1. This unit comprises an electron discharge device 47, which may be a triode vacuum tube having a cathode 48, a control electrode 49, and an anode 50. Cathode 48 may be grounded as shown. Control electrode 49 is connected through a capacitor 51 to one terminal of a winding 52 of transformer 53. The other terminal of winding 52 may be grounded as shown.

Anode 50 is connected through a winding 54 of transformer 53 to a source of postiive potential, as indicated at 55. The terminals of winding 56 of transformer 53 are connected respectively to output terminals 57 and 58.

There is also provided a second electron discharge device 59, which may also comprise a triode vacuum tube having a cathode 60, a control electrode 61, and an anode 62. Cathode 60 is connected through an adjustable resistance device 63 to control electrode 49 of vacuum tube 47. A resistor 64 is connected between control electrode 61 of vacuum tube 59 and a suitable source of negative potential as indicated at 65. A first input terminal 66 is coupled to control electode 61 by capacitor 67. The other input terminal 68 is preferably grounded as shown. Anode 62 is connected to positive potential source 55.

In operation, vacuum tube 47, in association with transformer 53 and capacitor 51, operates as a normally biased-off blocking oscillator. Each time this oscillator fires, a pulse of short duration is produced between output terminals 57 and 58. Vacuum tube 59 operates as a cathode follower to repeat at its cathode 60 positive-going pulses which are applied between input terminals 66 and 68. When such a pulse occurs, the potential of cathode 60 increases, and the resultant current flow increases the charge of capacitor 51. During the interval between input pulses, vacuum tube 59 is cut off, so that there is no appreciable leakage current path through which the charge on capacitor 51 may be dissipated. Thus control electrode 49 of vacuum tube 47 is maintained at a substantially fixed potential following the cessation of each input pulse.

The next input pulse causes a repetition of this cycle of events, and adds to the charge on capacitor 51, thus increasing the positive potential of control electrode 49. When the latter potential, after a series of input pulses, reaches a value equal to or exceeding the firing potential of the blocking oscillator, the oscillator will fire to produce a single output pulse between terminals 57 and 58.

The magnitude of the current available for charging capacitor 51 due to each input pulse may be varied by adjusting variable resistance device 63. In this way, the dividing circuit may be set to produce a single output pulse after a predetermined number of input pulses have occurred. The dividing factor is also dependent upon the negative potential of source 65, and may be varied at will merely by applying a suitable potential at this point. By changing the dividing factor at more or less random intervals, the secrecy of communication may be substantially enhanced. This is a feature of the present invention.

In the above-described coding process, the audio-frequency or other input signal voltage is effectively added to a sawtooth voltage. When the resultant sum attains a certain value, a pulse is produced. In this way, the period between pulses is made a function of the input signal voltage. The decoding process is very nearly the exact inverse of the coding process. Each received pulse initiates a sawtooth of predetermined shape, and each sawtooth is terminated by the following pulse. In this way, the amplitude to which the sawtooth rises is a function of the period between pulses and, by means of a sampling circuit and filter, a voltage corresponding to the input signal voltage is developed.

Figure 5:
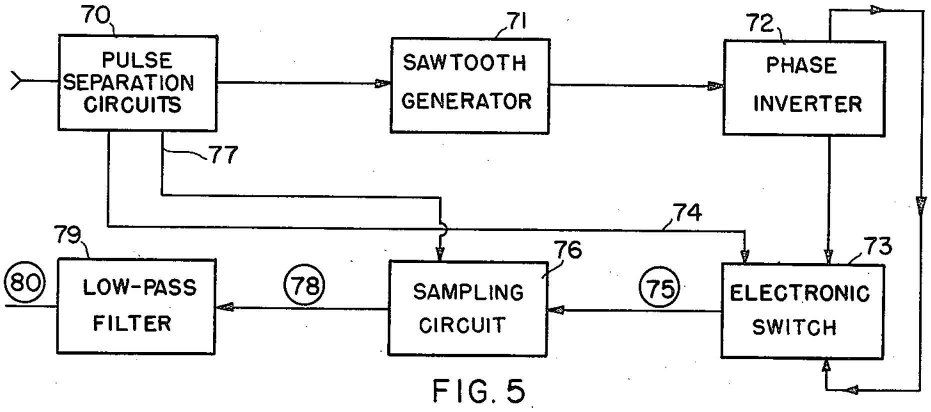
Fig. 5 represents, in block form, a decoder adapted for use at the receiving end of a pulse communication system in accordance with the present invention.

Fig. 5 is a block diagram of one embodiment of a decoder in accordance with the present invention. The input pulses, which comprise both intelligence and synchronizing pulses, are supplied to unit 70 comprising pulse separation circuits. The function of unit 70 is to distinguish and separate the intelligence pulses from the synchronizing pulses, and this unit is of conventional design. For example, a pair of delay multivibrators may be utilized. The second of these delay multivibrators furnishes an output pulse which, by virtue of its position in the time scale, contains the intelligence originally carried by the intelligence pulse fed into unit 70.

The intelligence pulse output from unit 70 is supplied to a sawtooth generator 71. Each intelligence pulse resets the generator after its output has reached a value dependent upon the spacing between successive pulses. The intelligence pulses from unit 70 are sufficiently long to insure the complete discharge of the capacitor in the saw-tooth generator 71, and so to provide a resetting period which extends appreciably beyond the complete discharge time. The resultant sawtooth voltage wave is then passed through a phase inverter 72, which supplies two output waves in phase opposition to an electronic switch 73.

Switch 73 is triggered by synchronizing pulses furnished from unit 70 by means of a connection 74. When the original input signal to the system comprises a modulated wave and the sense of coding is reversed after every three intelligence pulses, the output wave from switch 73 has the waveform indicated by curve 75 of Fig. 6.

This output wave is supplied to sampling circuit 76, which may be of the type disclosed and claimed in copending application Serial No. 22,803 filed April 23, 1948, in the name of James A. Krumhansl and assigned to the same assignee as the present invention. Unit 76 is actuated from unit 70 by means of a connection 77, in such a manner that it stores the peak value of each sawtooth wave before sawtooth generator 71 is reset by the next intelligence pulse. The resultant output of unit 76, therefore, is a step-function approximation of the original modulating signal, as indicated by curve 78 of Fig. 6. This wave is supplied to a low-pass filter unit 79, the resultant output of which, as shown by curve 80 of Fig. 6, approximates the original modulating signal. Any one of Figs. 1–3 of the above-mentioned copending application may be employed for sampling circuit 76. On each of these Figs. 1–3, waveform 75 may be applied to signal input terminals 17, 18; the connection 77 may be made to terminals 9, 10; and the output waveform 78 obtained between conductor 19 and ground (terminal 18).

If desired, sampling circuit 76 could be placed ahead of phase inverter 72 and electronic switch 73, with substantially the same overall results. The sequence shown in Fig. 5 is preferable, however, since it eliminates the undesired signal which would otherwise be introduced due to the switching operation. This desirable result is realized in the arrangement of Fig. 5 because the sampling circuit remains closed during the switching operation, and hence the system is unresponsive thereto.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination: a blocking oscillator comprising an electron discharge device having a control electrode and an anode; first and second cathode followers having a common cathode circuit, said first cathode follower having a control electrode; a coupling loop between said anode and said control electrode of said electron discharge device including said control electrode of said cathode follower; a source of input signals; means for applying said input signals to said control electrode of said electron discharge device including said second cathode follower; and means for utilizing the output of said blocking oscillator.

2. In combination: a blocking oscillator comprising an electron discharge device having a control electrode and an anode, and a multi-winding transformer; means connecting a first winding of said transformer to said anode; first and second cathode followers having a common cathode circuit, said first cathode follower having a control electrode; a coupling loop between said anode and said control electrode of said electron discharge device, including said control electrode of said cathode follower and a second winding of said transformer; a source of input signals; means for applying said input signals to said control electrode of said electron discharge device including said second cathode follower; and means including at third winding of said transformer for utilizing the output of said blocking oscillator.

3. In combination: a blocking oscillator comprising an electron discharge device having a control electrode and an anode; first and second cathode followers having a common cathode circuit; a connection between said cathode circuit and said control electrode; a coupling loop between said anode and the input circuit of said first cathode follower; a source of input signals; a coupling between said source and the input circuit of said second cathode follower; and means for utilizing the output of said blocking oscillator.

4. In combination: a blocking oscillator comprising an electron discharge device having a control electrode and an anode, and a multi-winding transformer; means connecting a first winding of said transformer to said anode; first and second cathode followers having a common cathode circuit; a connection between said cathode circuit and said control electrode; a coupling loop between said anode and the input circuit of said first cathode follower, said coupling including a second winding of said transformer; a source of input signals; a coupling between said source and the input circuit of said second cathode follower; and means for utilizing the output of said blocking oscillator.

5. In combination, a blocking oscillator having an input circuit; a source of modulating voltage; means applying said voltage to said input circuit to control the recurrence frequency of the output impulses of said oscillator; and means for establishing a reference voltage in said input circuit at the termination of each cycle of the output of said oscillator; the last named means comprising a source of said reference voltage, means constituting a normally interrupted coupling path between the last named source and said input circuit, and means utilizing the output of said oscillator to complete said path during each impulse of said output.

6. In combination, a blocking oscillator having an input circuit, a source of modulating voltage, means applying said voltage to said input circuit to control the recurrence frequency of the output impulses of said oscillator, and means for establishing a reference voltage level in said input circuit, the last named means comprising a source of voltage of said reference level and a circuit coupling said reference voltage source to said input circuit, said coupling circuit comprising a normally non-conducting space discharge device and means applying the output of said oscillator to said device to render it conducting during each impulse of said output.

7. In combination, a blocking oscillator, a source of modulating voltage, means applying said voltage to the input of said oscillator to control the recurrence frequency of the output impulses thereof, a source of reference voltage, means coupling said source of reference voltage to the input of said oscillator, a switching means normally interrupting said coupling means and means applying the output of said blocking oscillator to said switching means whereby said coupling means is completed during each impulse in the output of said oscillator.

8. In combination, a blocking oscillator, a source of modulating voltage, means applying said voltage to the input of said oscillator to control the recurrence frequency of the output impulses thereof, a source of reference voltage, means coupling said source of reference voltage to the input of said oscillator, said coupling means including the space discharge path of an electric discharge device having a control electrode, and means applying the output of said oscillator to said control electrode, whereby said space discharge path is completed during each impulse of the output of said oscillator.

9. A pulse-position modulated pulse generator comprising in combination a blocking oscillator; said oscillator including a vacuum tube having a control electrode, and a condenser connected to said control electrode and having the output of said tube coupled thereto whereby said condenser is charged during the generation of an output impulse by said oscillator; a source of modulating voltage; means coupling said source to said condenser whereby the recurrence frequency of the output impulses of said oscillator becomes a function of said modulating voltage; and means establishing a reference voltage level at said condenser at the termination of each impulse of the output of said oscillator, the last named means comprising an electric discharge device having an anode, a cathode and a control electrode, said anode being maintained at said reference voltage, said cathode being coupled to said condenser and said control electrode of said device having coupled thereto the output of said oscillator, said device being non-conductive except during the impulses of the output of said oscillator.

JAMES A. KRUMHANSL.
GLENN H. MILLER.

REFERENCES CITED

The following references are of record in the file of this patent:

UNITED STATES PATENTS

| Number | Name | Date |
|---|---|---|
| Re. 23,288 | Krumhansl et al. | Oct. 24, 1950 |
| 2,266,401 | Reeves | Dec. 16, 1941 |
| 2,289,564 | Wrathall | July 14, 1942 |
| 2,444,890 | Hite et al. | July 6, 1948 |
| 2,448,814 | Mann et al. | Sept. 7, 1948 |
| 2,449,467 | Goodall | Sept. 14, 1948 |
| 2,466,230 | Goldberg | Apr. 15, 1949 |